United States Patent [19]

Westbrook

[11] Patent Number: 5,259,028
[45] Date of Patent: Nov. 2, 1993

[54] TELEPHONE HOLDER

[76] Inventor: William S. Westbrook, 425 N. Somonauk St., Somonauk, Ill. 60552

[21] Appl. No.: 686,464

[22] Filed: Apr. 17, 1991

[51] Int. Cl.$^5$ .............................................. H04M 1/00
[52] U.S. Cl. ................................... 379/455; 379/435; 379/436; 248/447.1
[58] Field of Search ............... 379/453, 454, 455, 435, 379/436; 52/28, 36; 248/441.1, 445, 447.1

[56] References Cited

U.S. PATENT DOCUMENTS

| | | | |
|---|---|---|---|
| 3,338,002 | 8/1967 | Ericsson et al. | 52/28 |
| 3,511,942 | 5/1970 | Quigley | 52/28 |
| 3,946,977 | 3/1976 | Kuhfus | 379/435 |
| 4,349,706 | 9/1982 | Thompson | 379/454 |
| 4,406,928 | 9/1983 | MacKenzie | 379/454 |
| 5,029,339 | 7/1991 | Caron | 379/453 |
| 5,033,709 | 7/1991 | Yuen | 379/454 |

Primary Examiner—Jin F. Ng
Assistant Examiner—Huyen D. Le

[57] ABSTRACT

A telephone holder which can be secured to either the vertically extending side wall of a conveniently located item or a horizontally extending upwardly facing wall thereof, on which a telephone can be held for easy reach by a user. The holder includes a base plate on which the telephone is secured, an elongated vertically extending mounting plate integrally joined to the base plate along a side edge and extending substantially normal thereto, a pair of spaced apart horizontally extending mounting plates integrally joined to the base plate along its lower edge and extending substantially normal to the base plate in one direction therefrom, and another horizontally extending mounting plate integrally joined to the base plate along its lower edge in the space between the pair of spaced apart horizontally extending mounting plates, also extending substantially normal to the base plate but in the opposite direction therefrom. Adhesive strips are secured to each mounting plate covered by peel off release sheets to adhere the holder to a selected item for easy reach by a user.

6 Claims, 6 Drawing Sheets

TELEPHONE HOLDER

BACKGROUND OF THE INVENTION

This invention relates to the field of holders for telephones in which the holder can be secured to another item such as a desk top, side wall of a cabinet, side or top wall of a computer monitor and the like.

Prior art devices in this general field known to the inventor include those described and shown in the following United States patents.

U.S. Pat. No. 4,797,916 discloses an adjustable cradle mounting bracket for installing in a vehicle to secure the handset cradle of a mobile telephone so as to orient it in any of a number of different positions.

U.S. Pat. No. 4,406,928 discloses a holder for a compact telephone subset comprising a tray, a clip assembly secured to the tray to hold the telephone subset therein, the clip assembly having a first pair of inwardly extending flexible arms which project outwardly from the open wall of the tray to grasp an intermediate portion of the subset and a second pair of arms which project outwardly in the same direction as the first pair located at one end of the tray to support an end wall of the telephone subset when received in the tray.

U.S. Pat. No. 4,067,532 discloses a two part removable fastening attachment for temporarily hanging a telephone receiver or other item, comprising a first part having a socket which has an adhesive backing to secure to a planar surface such as the side wall of a telephone, and a second part having a ball to be received in the socket of the first part which has an oppositely facing adhesive plate to which an item such as a telephone handset can be adhered. The handset with the second part of the two part fastening device thereon can then be temporarily hung on the side of the telephone by seating the ball in the socket of the first part adhered to the side wall of the telephone.

U.S. Pat. No. 3,946,977 discloses a retractable bracket slidably mounted in a recess in the bottom surface of a telephone unit base, the bracket having a keyhole aperture at its outer end to receive a wall hook or the like when the bracket is moved to its extended position, the bracket being slidably movable to a retracted position when the keyhole aperture is not being used whereby the keyhole aperture and outer end of the bracket do not project outwardly from the end of the telephone unit.

U.S. Pat. No. 3,410,513 discloses a data recording device attached to the side wall of a telephone by an adhesive strip secured to the back wall of the support member of the data recording device. The data recording device comprises hinged panels, one of which includes a grooved channel to receive an index card or the like, another to receive a writing pad, also a holder for a pen and pencil.

U.S. Pat. No. 354,469 discloses an adjustable telephone support comprising a vertical support column, brackets slidably mounted thereon having set screws to hold at the desired location, the back plate of the telephone secured to the slidable brackets whereby the telephone can be raised or lowered to a desired level and held at such location by tightening the set screws of the brackets.

The telephone holder in accordance with the present invention provides improved versatility and convenience by making it possible to locate the telephone at any one of a number of locations which may be most convenient for the user. The holder includes both vertical and horizontal mounting plates which make it possible to secure the holder to either a horizontally extending surface such as a desk top, or a vertically extending surface such as the side wall of a cabinet. The mounting plates are provided with adhesive strips covered with a release sheet of paper or plastic material which can be peeled off when such mounting plate is to be secured to the corresponding surface of a selected item.

One convenient item to which the holder in accordance with this invention can be secured is a computer monitor. The holder can be secured to either the side wall of the monitor or to its top wall.

The holder includes a base plate having a pair of elongated vertically extending slots, through which a corresponding pair of mounting screws extend. The heads of the mounting screws are received in corresponding apertures and slots in the bottom wall of the base of a telephone. Butterfly nuts on the other ends of the screws are tightened by hand to draw the telephone securely against the base plate.

The mounting plates extend from the bottom edge and side edge of the base plate at substantially right angles and are integrally joined to the base plate. Such construction provides reinforced rigidity and stability to the base plate both vertically and horizontally, while at the same time performing the function of mounting plates to secure the holder to another item.

SUMMARY OF THE INVENTION

It is an object of the invention to provide a telephone holder which can be secured to any convenient item on either a vertically extending side wall thereof or a horizontally extending upwardly facing wall thereof.

It is an object of the invention to provide a telephone holder which can be secured to any convenient item by means other than screws or bolts.

It is an object of the invention to provide a telephone holder having mounting plates which extend from edges of its base plate at substantially right angles to thereby reinforce rigidity and stability of the base plate both vertically and horizontally.

BRIEF DESCRIPTION OF THE DRAWING

FIG. 6 is a perspective view of a strip of adhesive of the kind secured to each mounting plate of the telephone holder, having an adhesive surface on both opposite sides, both covered initially by a thin release sheet which can be peeled off of the one side when it is to be adhered to the mounting plate, and of the opposite side when it is to be adhered to whatever item the holder is going to be mounted on.

DESCRIPTION OF PREFERRED EMBODIMENT

Figure 1:
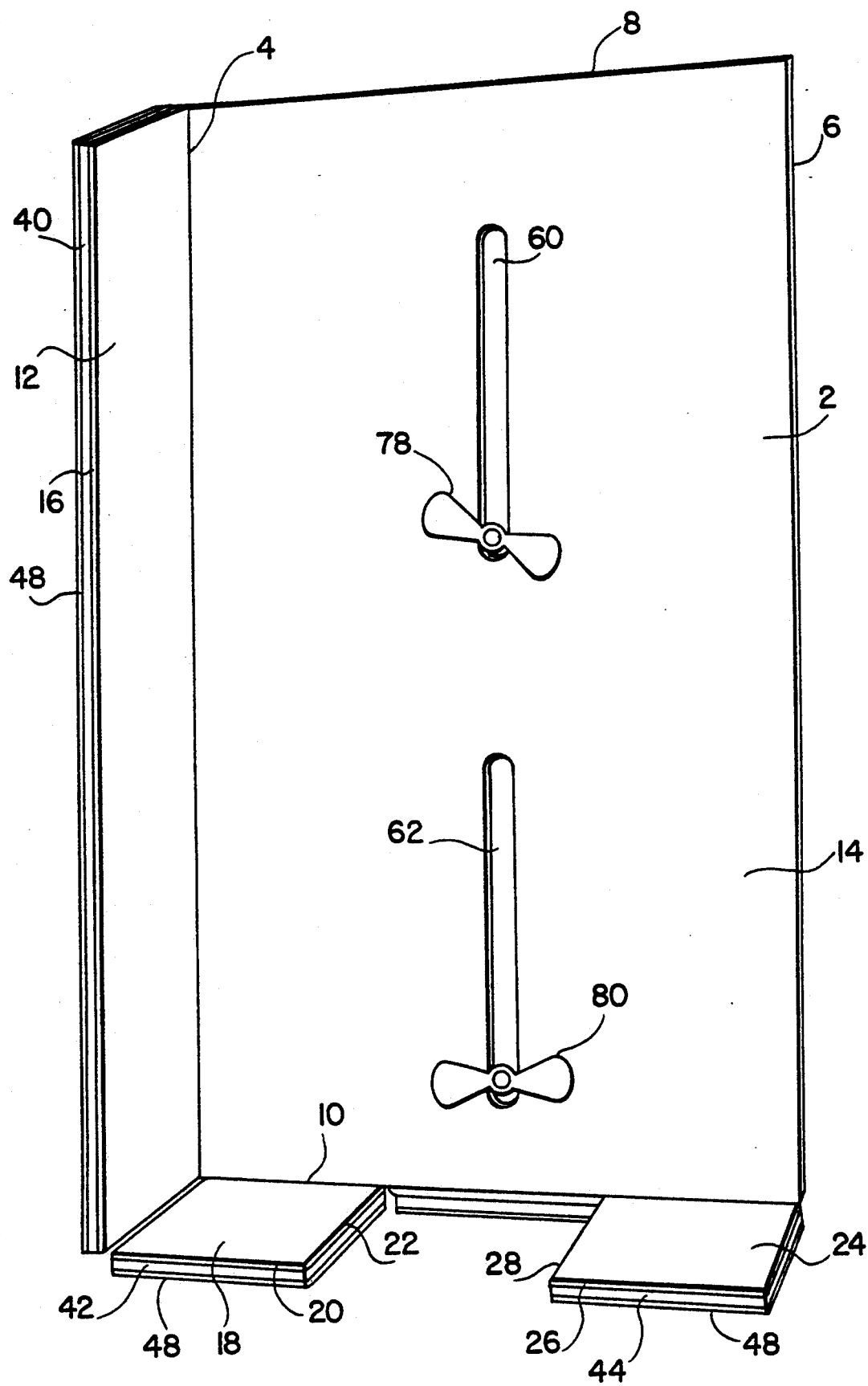
FIG. 1 is a perspective view of the forward facing side of a telephone holder in accordance with this invention.
Figure 2:
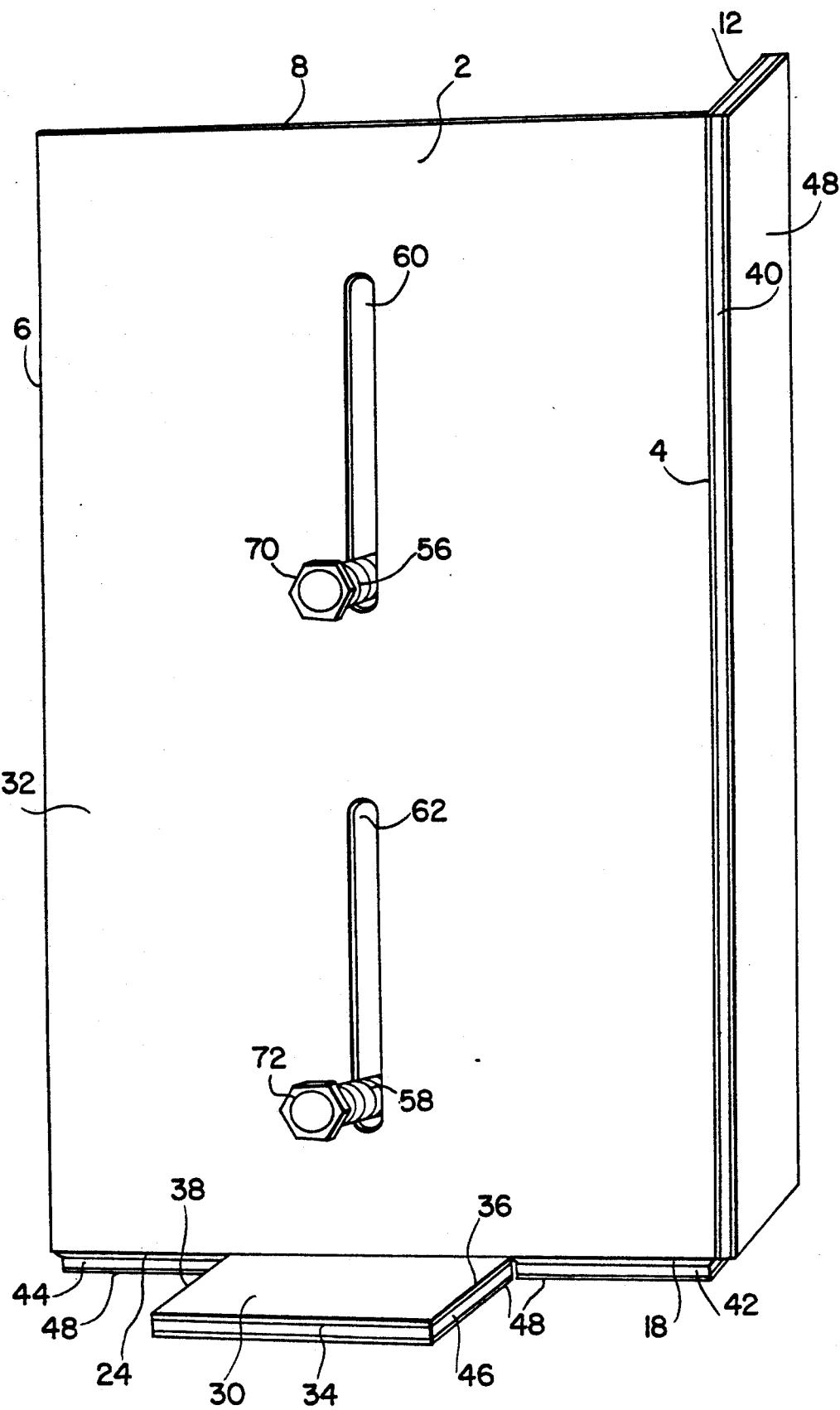
FIG. 2 is a perspective view of the rearward facing side of the telephone holder shown in FIG. 1.
Figure 3:
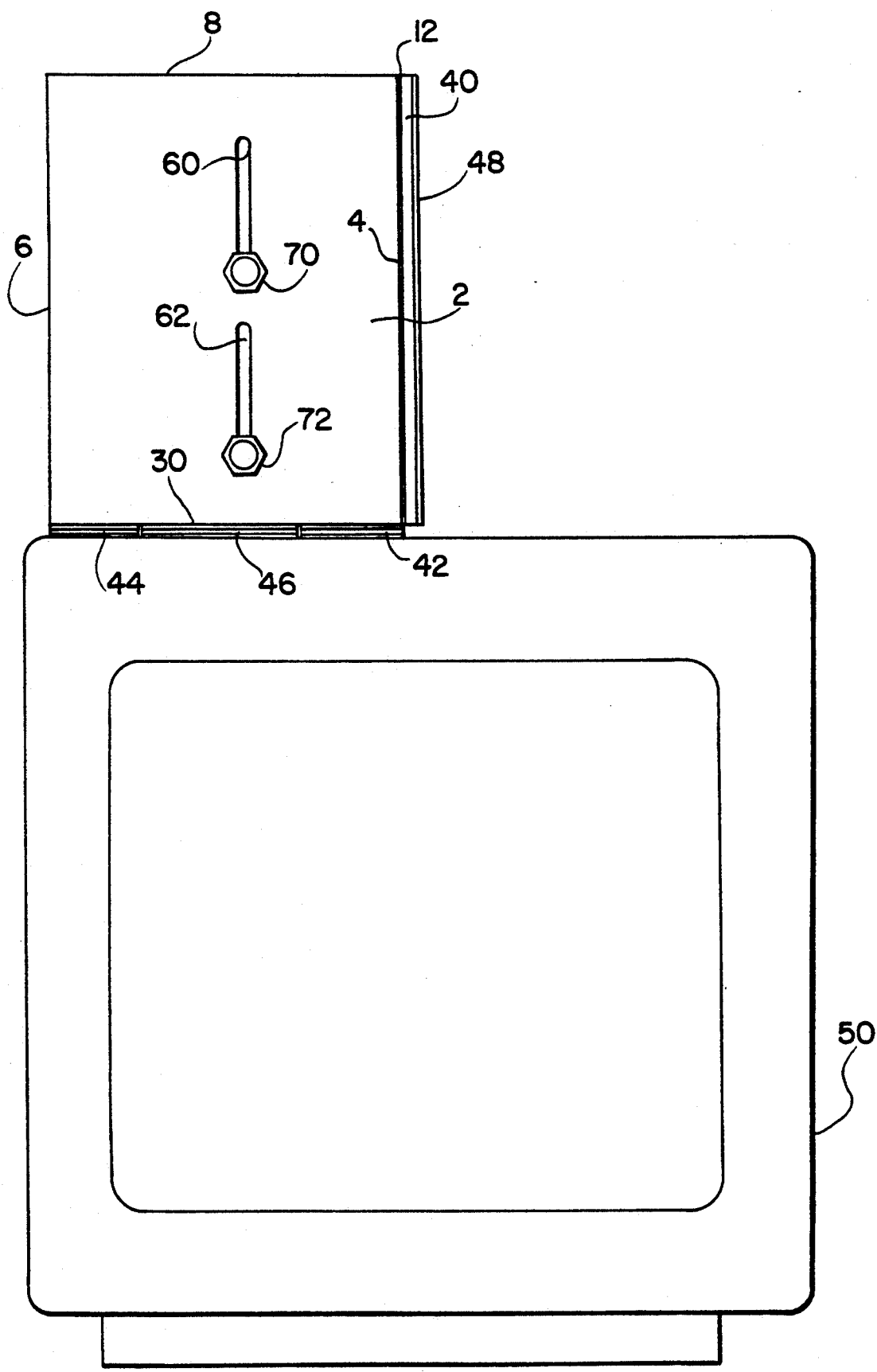
FIG. 3 is a front elevation view of the telephone holder in accordance with this invention shown secured to the top wall of a computer monitor.
Figure 4:
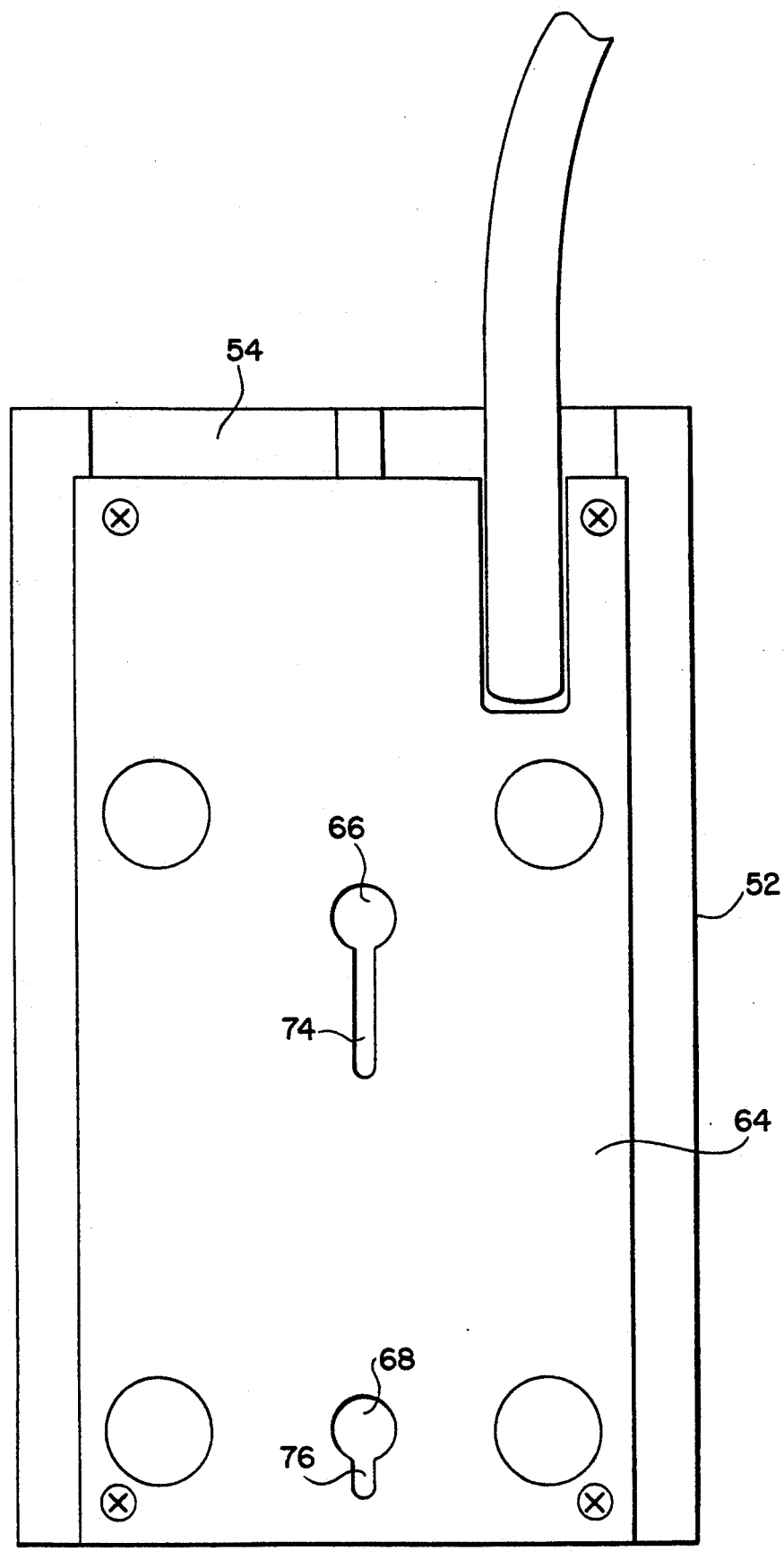
FIG. 4 is a plan view of the bottom wall of a telephone showing the receiving apertures and slots therein to receive mounting screws to hold the telephone to the base plate of the holder.
Figure 5:
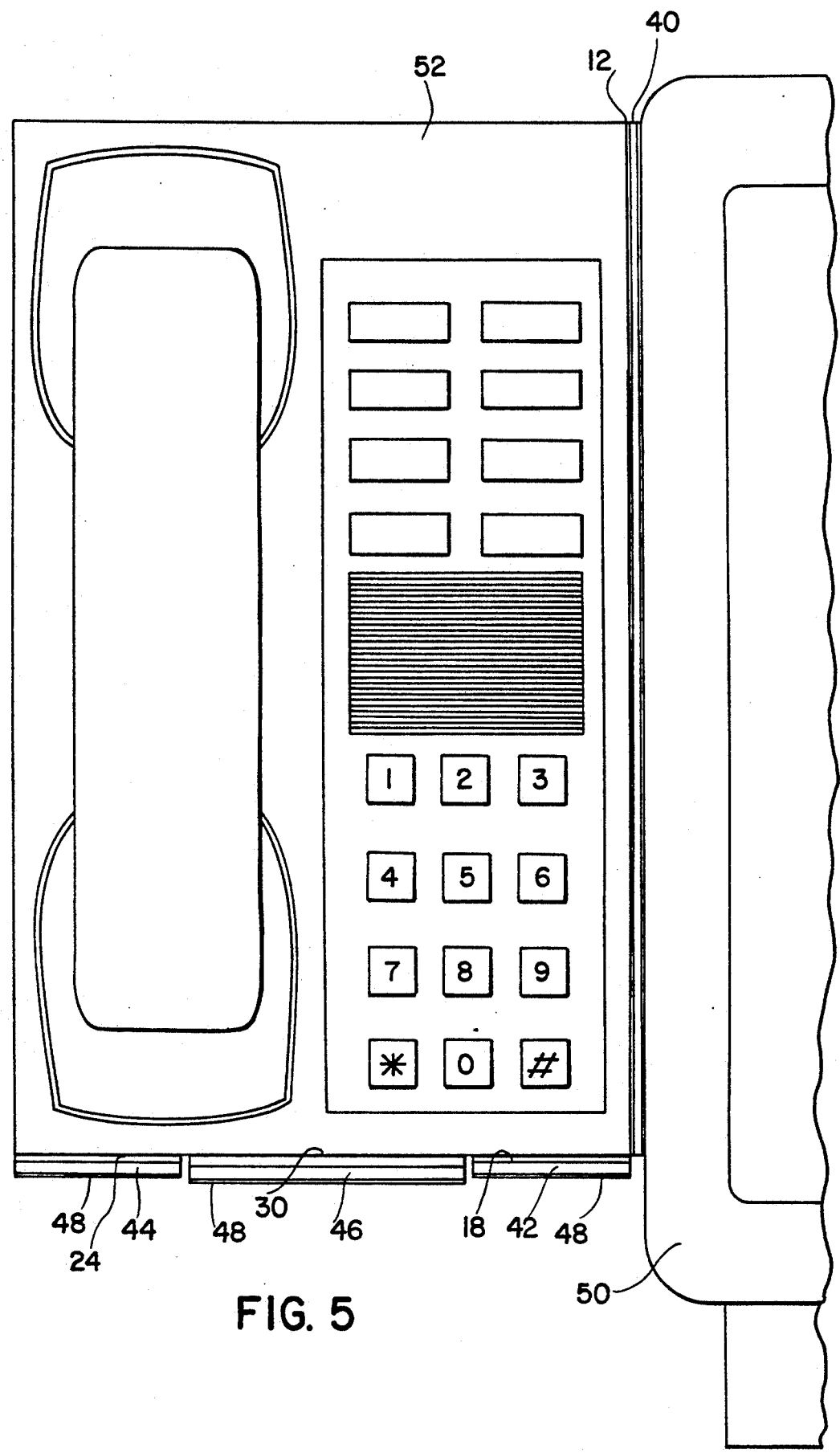
FIG. 5 is an elevation view of a telephone holder in accordance with this invention secured to the vertically extending side wall of a computer monitor, and showing a telephone secured to the holder.
Figure 6:
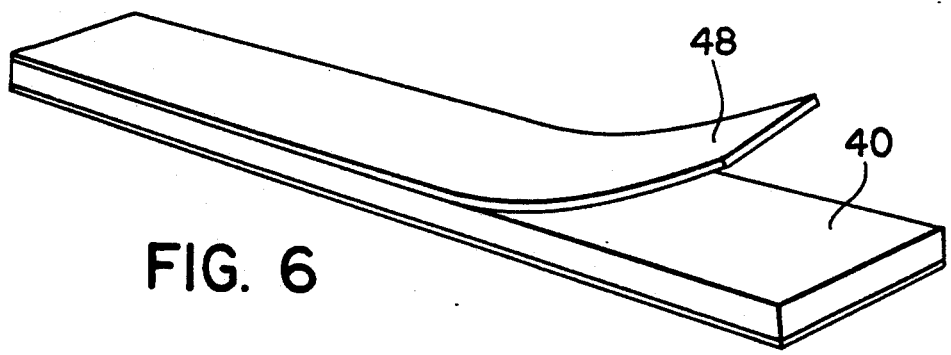
Figure 7:
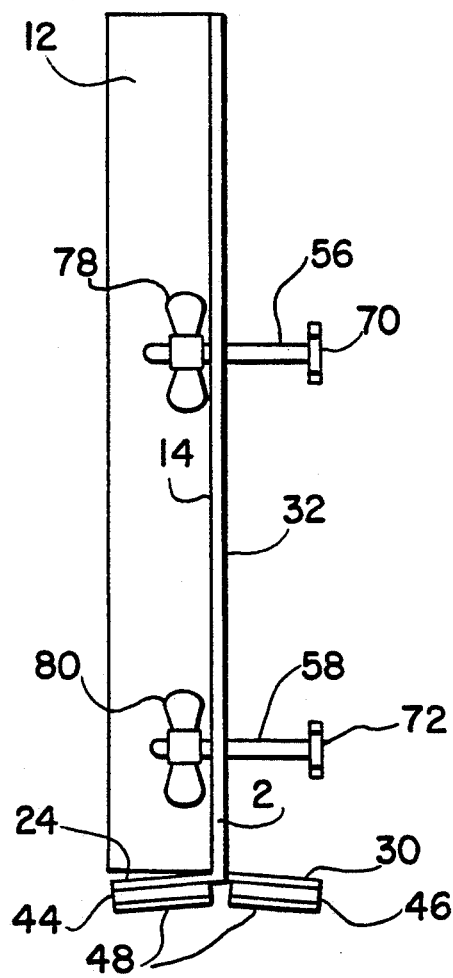
FIG. 7 is a side elevation view of a modified embodiment of the invention showing mounting plates along the lower edge extending from the upright base plate at greater than a ninety degree angle.

A telephone holder in accordance with this invention comprises a base plate 2 which is rectangular having a pair of vertically extending relatively long side edges 4 and 6, and a relatively shorter upper edge 8 and a similarly shorter lower edge 10.

A vertically extending relatively long first mounting plate 12 extends from side edge 4 of the base plate 2 and at a right angle thereto in the direction facing away from the forwardly facing surface 14 of the base plate 2. The first mounting plate 12 extends in such direction and terminates in an elongated vertically extending forward edge 16 a relatively short distance, such as about an inch, forward from the forwardly facing surface 14 of base plate 2.

A horizontally extending relatively short second mounting plate 18 extends from lower edge 10 of the base plate 2 and at substantially a right angle thereto in the direction facing away from the forwardly facing surface 14 of the base plate 2. This second mounting plate 18 extends in such direction and terminates in a relatively short horizontally extending forward edge 20 about an inch forward from the forwardly facing surface 14 of base plate 2.

This second mounting plate 18 extends horizontally along the lower edge 10 of base plate 2 starting at its side edge 4 and extending about an inch and a half in the direction toward side edge 6 of the base plate 2 terminating in a short side edge 22.

A horizontally extending relatively short third mounting plate 24 extends from the lower edge 10 of the base plate 2 and at substantially a right angle thereto in the direction facing away from the forwardly facing surface 14 of the base plate 2. This third mounting plate 24 extends in such direction and terminates in a relatively short horizontally extending forward edge 26 about an inch forward from the forwardly facing surface 14 of the base plate 2.

This third mounting plate 24 extends horizontally along the lower edge 10 of base plate 2 starting at its side edge 6 and extending about an inch and a half in the direction toward side edge 4 of the base plate 2 terminating in a short side edge 28.

A fourth mounting plate 30 extends horizontally from the lower edge 10 of the base plate 2 and at substantially a right angle thereto in the direction facing away from the rearwardly facing surface 32 of the base plate 2. This fourth mounting plate 30 extends in such direction and terminates in a horizontally extending rearward edge 34 about an inch rearward from the rearwardly facing surface 32 of the base plate 2.

This fourth mounting plate 30 extends horizontally along the lower edge 10 of the base plate 2 in the space between the second mounting plate 18 and third mounting plate 24, both of which extend in the opposite direction from the direction in which the fourth mounting plate extends. The fourth mounting plate 30 terminates at one side in side edge 36 and at its opposite side in side edge 38.

A first strip 40 of adhesive material is adhered to the outwardly facing surface of the first mounting plate 12.

A second strip 42 of adhesive material is adhered to the downwardly facing surface of the second mounting plate 18. A third strip 44 of adhesive material is adhered to the downwardly facing surface of the third mounting plate 24. A fourth strip 46 of adhesive material is adhered to the downwardly facing surface of the fourth mounting plate 30.

Each strip of adhesive material is covered by a nonadhesive release strip 48, which releasably adheres to the adhesive surface of each strip and which can be peeled off when it is desired to expose the adhesive surface of one or more of the strips for adhering to the surface of something on which the telephone holder in accordance with this invention is to be mounted.

The telephone holder may be mounted to the side or top wall of a computer monitor 50, and a telephone 52 held thereon for convenient access. The telephone holder may be secured to any other convenient items, such as a desk top, a cabinet, the wall of the room, and the like. It may be secured by adhering its first vertically extending mounting plate 12 and its adhesive strip 40 to the corresponding side wall of a computer monitor or other item, or by adhering the downwardly facing surfaces of its second, third, and fourth mounting plates 18, 24 and 30 and their adhesive strips 42, 44 and 46 to the upwardly facing surface of the top wall of a computer monitor or other item.

The base plate 2 has approximately the same dimensions as the base 54 of a telephone 52, and it has mounting screws 56 and 58 in elongated vertical slots 60 and 62 to secure the base 54 of a telephone 52 to the base plate 2.

The bottom wall 64 of the telephone base 54 includes a pair of receiving apertures 66 and 68 having a configuration and dimension to receive the enlarged heads 70 and 72 of the mounting screws 56 and 58 therethrough. An elongated slot 74 extends downwardly from receiving aperture 66, the width of the slot being smaller than the diameter of the aperture 66, such width corresponding to the diameter of the shank of the mounting screw 56 to be received therein. A short slot 76 extends downwardly from receiving aperture 68, the width being the same as that of slot 74 to receive the shank of the mounting screw 58 therein.

The base 54 of the telephone 52 is preferably secured to the rearwardly facing surface 32 of the base plate 2. The enlarged heads 70 and 72 of the mounting screws 56 and 58 project outwardly from the rearwardly facing surface 32 to be received in the respective receiving apertures 66 and 68 in the bottom wall 64 of the telephone base 54, and moved downwardly therefrom into the respective slots 74 and 76. The shanks of the mounting screws 56 and 58 extend through the elongated vertical slots 60 and 62 of base plate 2 with their free ends projecting outwardly from the forwardly facing surface 14 of the base plate 2. A pair of butterfly nuts 78 and 80 are threaded on respective ones of the mounting screws 56 and 58 for tightening by hand against the forwardly facing surface 14 of base plate 2 which draws the telephone base 54 securely against the rearwardly facing surface 32 thereof.

The base plate 2, mounting plate 12, mounting plate 18, mounting plate 24 and mounting plate 30 are preferably of metal, the mounting plates each being integrally joined to corresponding side edges of the base plate 2 and extending substantially normal thereto. Such construction of the mounting plates enable them to also perform the function of reinforcing the rigidity and stability of the base plate 2, both laterally (or horizontally) and longitudinally (or vertically).

A convenient size of the base plate 2 for use with telephones commonly used in both offices and homes is about nine inches in the vertical or longitudinal dimension and about six inches in the horizontal or lateral dimension.

Each mounting plate 12, 18, 24 and 30 extend outwardly from the base plate 2 about one inch, which provides a sufficient surface area for the adhesive strips to secure the holder to a computer monitor or other convenient item. Along the lower edge 10 of the base plate 2, the mounting plate 18 and 24 extend in one direction from the base plate 2 and mounting plate 30 extends in the opposite direction therefrom. Such construction whereby the outer two mounting plates 18 and 24 extend in one direction and the middle mounting plate 30 extends in the opposite direction increases the adherent holding power of such mounting plates when adhered to a computer monitor or other convenient item, to more securely hold the base plate 2 and telephone 52 thereon rigidly in place.

The lateral dimension of mounting plate 18 from its side edge 22 to side edge 4 of the base plate 2 is about an inch and a half, and of mounting plate 24 from its side edge 28 to side edge 6 of the base plate 2 is also about an inch and a half. The lateral dimension of mounting plate 30 between its side edges 36 and 38 is about two and three-quarters inches.

These dimensions are provided by way of example. The base plate and mounting plates may be of other convenient dimensions for use with telephones of differing sizes and types.

The adhesive strips 40, 42, 44 and 46 are preferably of the type which have adhesive on both opposite surfaces, each covered initially by a release strip of paper or plastic material which can be peeled off to expose the adhesive surface when ready to use. The adhesive strips 40, 42, 44 and 46 are already adhered to their respective mounting plates when the holder in accordance with this invention is assembled for use and sale. Thus, one of the release strips has already been peeled off. When assembled and ready for use and sale, the other release strips 48 on the now outwardly facing sides of the adhesive strips 40, 42, 44 and 46 remain in place, to be peeled off of whichever ones of the adhesive strips are to be secured to a support item, such as a computer monitor.

The rearwardly facing planar surface 32 of the base plate 2 lies in a first plane, the outwardly facing planar surface of mounting plate 12 which extends along side edge 4 of the base plate 2 lies in a second plane which intersects the first plane at substantially a right angle, and the downwardly facing planar surfaces of mounting plates 18 and 24 which extend along the lower edge 10 of the base plate 2 lie in a third plane which intersects both the first and second planes at substantially right angles.

In a modification, the mounting plates 18, 24 and 30 extend from the lower edge 10 of base plate 2 in a slightly oblique angle facing upwardly, such as a ninety-one degree angle. Thus when downward force is applied to the base plate 2 to press the adhesive strips 42, 44 and 46 of mounting plates 18, 24 and 30 against the surface they are to be adhered to, the mounting plates can give somewhat and bend back toward the base plate 2 up to one degree and still be substantially normal or perpendicular to the base plate 2 in a substantially right angle of ninety degrees. The entire surface of the adhesive strips can thus be assured of being pressed into full facing adherent contact with the surface to which the holder is being secured.

I claim:

1. A telephone holder comprising a base plate, telephone securing means to secure a telephone to said base plate, said base plate including a longitudinally extending side edge having a first end and an opposite second end, a laterally extending end edge extending laterally from said first end of said longitudinally extending side edge, first reinforcing means along said longitudinally extending side edge, said first reinforcing means including first holder securing means to secure said telephone holder to a support member, including second reinforcing means along said laterally extending end edge, said second reinforcing means including second holder securing means to secure said telephone holder to a support member, wherein said second reinforcing means includes a second mounting plate along said laterally extending end edge substantially normal to said base plate and integrally joined thereto, wherein said second reinforcing means includes a third mounting plate along said laterally extending end edge substantially normal to said base plate and integrally joined thereto, said third mounting plate extending outwardly from said base plate in one direction, said second mounting plate extending outwardly from said base plate in the opposite direction.

2. A telephone holder as set forth in claim 1, wherein said second reinforcing means includes a fourth mounting plate along said laterally extending end edge substantially normal to said base plate and integrally joined thereto, said fourth mounting plate extending outwardly from said base plate in the same direction as said second mounting plate.

3. A telephone holder as set forth in claim 2, wherein said second and fourth mounting plates which extend outwardly from said base plate in said one direction are spaced apart and said third mounting plate which extends outwardly from said base plate in said opposite direction is integrally connected to said laterally extending end edge between the points where said second and fourth mounting plates are integrally connected thereto.

4. A telephone holder as set forth in claim 1, wherein said first holder securing means of said first reinforcing means comprises an outwardly facing planar surface on said first mounting plate facing away from said base plate to which said first mounting plate is integrally joined, and adhesive means on said outwardly facing planar surface to adhere said telephone holder to a said support member.

5. A telephone holder as set forth in claim 4, wherein said adhesive means on said outwardly facing planar surface includes a strip of adhesive material having an outwardly facing adhesive surface, a release strip of thin sheet material releasably covering said outwardly facing adhesive surface which is releasable therefrom by pulling off when ready to expose said adhesive surface to adhere said telephone holder to a said support member.

6. A telephone holder comprising a base plate having a planar surface lying in a first plane, telephone securing means to secure a telephone to said base plate, a first mounting plate having a planar surface lying in a second plane which intersects said first plane at substantially a right angle extending from said base plate, a second mounting plate having a planar surface lying in a third plane which intersects both said first and second planes at substantially right angles extending from said base plate, including a third mounting plate lying in said third plane extending from said base plate spaced apart from said second mounting plate, including a fourth mounting plate lying in said third plane extending from said base plate in one direction, said second and third spaced apart mounting plates extending from said base plate in the opposite direction from locations on each side of the place where said fourth mounting plate extends from said base plate.

* * * * *